March 6, 1951 J. D. CHIRITE 2,543,761

HANDSET SUPPORT AND INDUCTION PICKUP FOR TELEPHONE AMPLIFYING SYSTEMS

Filed July 21, 1947 4 Sheets-Sheet 1

INVENTOR.
John Douglas Chirite,
BY
John B. Brady
ATTORNEY

INVENTOR.
John Douglas Chirite,
BY
John B. Brady
ATTORNEY

March 6, 1951 J. D. CHIRITE 2,543,761

HANDSET SUPPORT AND INDUCTION PICKUP FOR TELEPHONE AMPLIFYING SYSTEMS

Filed July 21, 1947 4 Sheets-Sheet 3

INVENTOR.
John Douglas Chirite,
BY
John B. Brady
ATTORNEY

March 6, 1951 J. D. CHIRITE 2,543,761

HANDSET SUPPORT AND INDUCTION PICKUP FOR TELEPHONE AMPLIFYING SYSTEMS

Filed July 21, 1947 4 Sheets-Sheet 4

INVENTOR.
John Douglas Chirite,
BY
John B. Brady
ATTORNEY

Patented Mar. 6, 1951

2,543,761

UNITED STATES PATENT OFFICE 2,543,761

HANDSET SUPPORT AND INDUCTION PICK-UP FOR TELEPHONE AMPLIFYING SYSTEMS

John Douglas Chirite, Detroit, Mich.

Application July 21, 1947, Serial No. 762,263

7 Claims. (Cl. 179—1)

Figures 1, 7, 8, 15, 16, 17, 18:
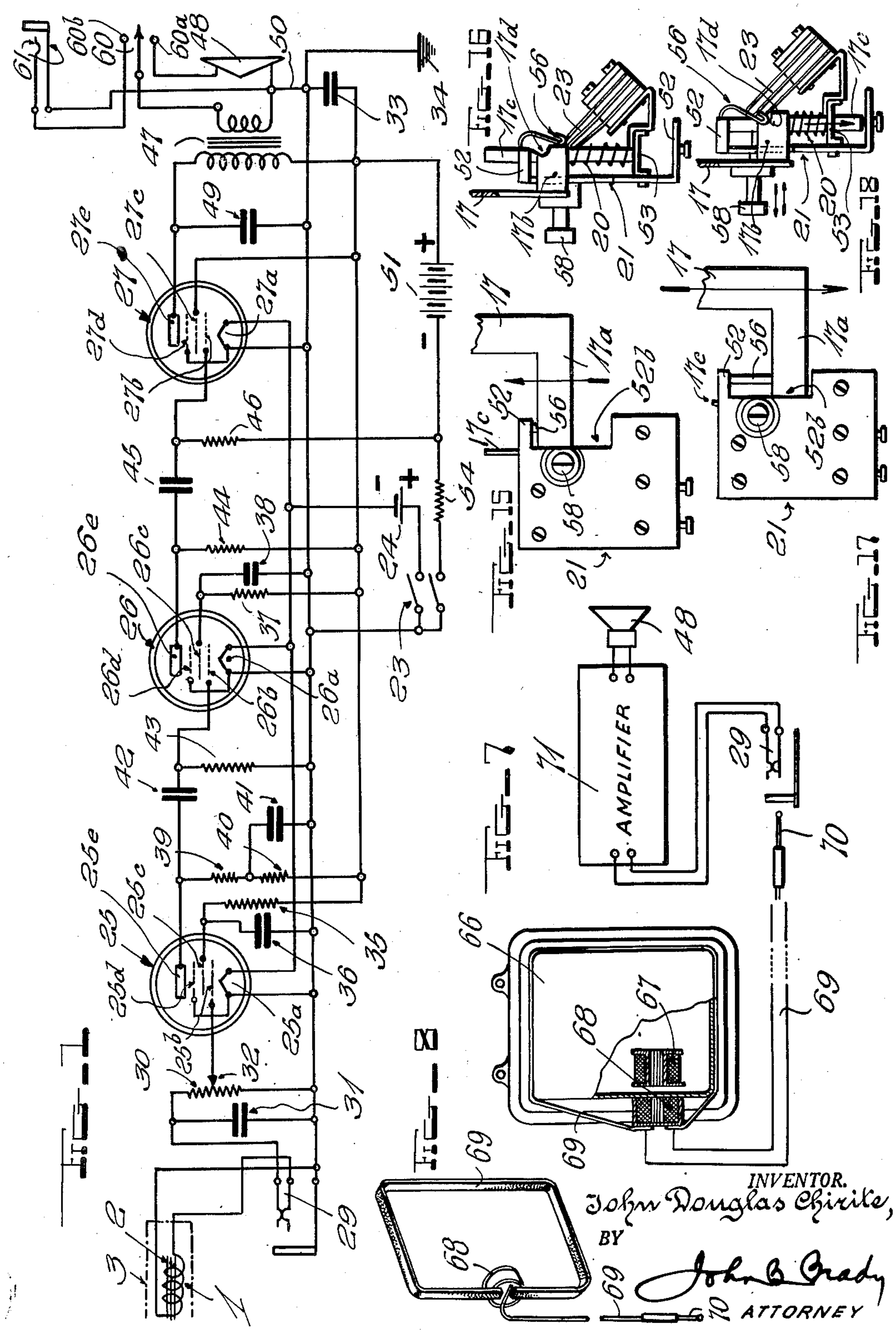

My invention relates broadly to telephone systems and more particularly to a compact electronic attachment for telephone systems for picking up, amplifying and reproducing a telephone conversation through a loud speaker so that the incoming telephonic speech may be heard with or without the use of the conventional telephone receiver or handset making it possible to record the incoming telephone signal.

One of the objects of my invention is to provide an attachment of compact construction for telephones having a specially designed pick-up or induction coil which may be located in proximity to the transformer or induction coil in a subscriber's telephone desk set or telephone wall box for impressing incoming telephonic speech energy upon a suitable amplifier unit of compact arrangement operative to amplify the incoming telephonic speech energy for reproduction on a loud speaker.

Another object of my invention is to provide an attachment for a conventional telephone desk set which conforms to the contour of the desk set and houses an amplifier and provides an auxiliary cradle for receiving the telephone handset in reverse position immediately adjacent the normal position of the handset and allowing incoming telephonic speech energy to be amplified through the amplifier unit and reproduced through a loud speaker completely associated therewith.

Still another object of my invention is to provide an attachment of compact construction for telephone desk sets which conforms in contour with the contour of the standard telephone desk set and provides an auxiliary cradle for supporting the telephone handset when removed from the standard telephone desk set in combination with amplifier and reproducer means located in the base of the attachment for amplifying and reproducing incoming telephone speech energy at sufficient volume to permit the telephone speech energy from the remote end of the circuit to be readily audible for conference use throughout a relatively large room.

A still further object of my invention is to provide an automatic waiting attachment for telephones including means for amplifying incoming telephone signal energy so as to be readily audible to anyone at a very substantial distance from the telephone.

A still further object of my invention is to provide a novel arrangement of electrical and magnetic shielding means for the circuit elements of an amplification and reproducing system which is compactly associated with the conventional desk telephone in such a manner as to eliminate noise and/or undesirable oscillation due to close proximity of the pick-up coil, output transformer and loud speaker.

Still another object of my invention is to provide an arrangement of telephone amplifier for association with conventional telephone desk sets in which automatic disconnection of the telephone amplifier is effected upon conclusion of the use of the device at the time that the handset is restored to the cradle of the telephone desk set.

Still another object of my invention is to provide an amplification attachment unit for telephones for amplifying incoming telephonic signal energy for conference convenience without the necessity of effecting any mechanical connection to the telephone system and without subjecting the telephone system to any loading or the establishment of interference with the extensive operating facilities of the telephone system.

Figure 2:
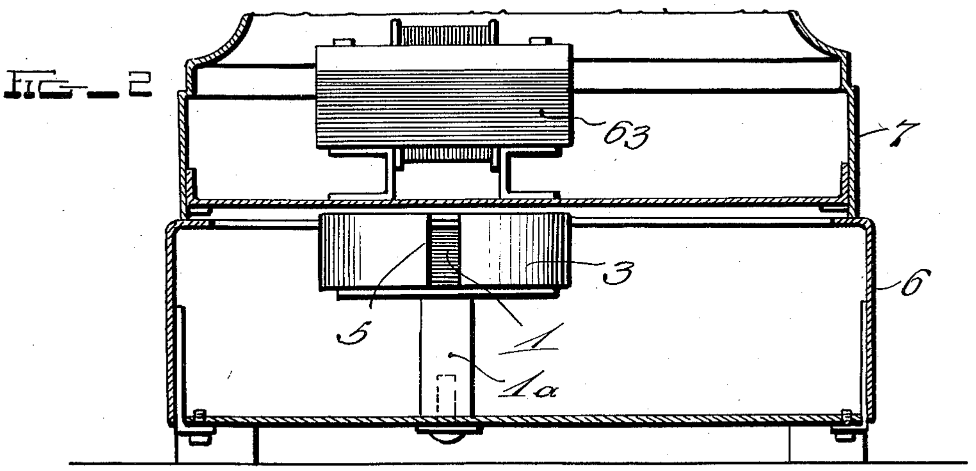
Figures 3, 4, 5, 6, 19, 20, 21, 22:
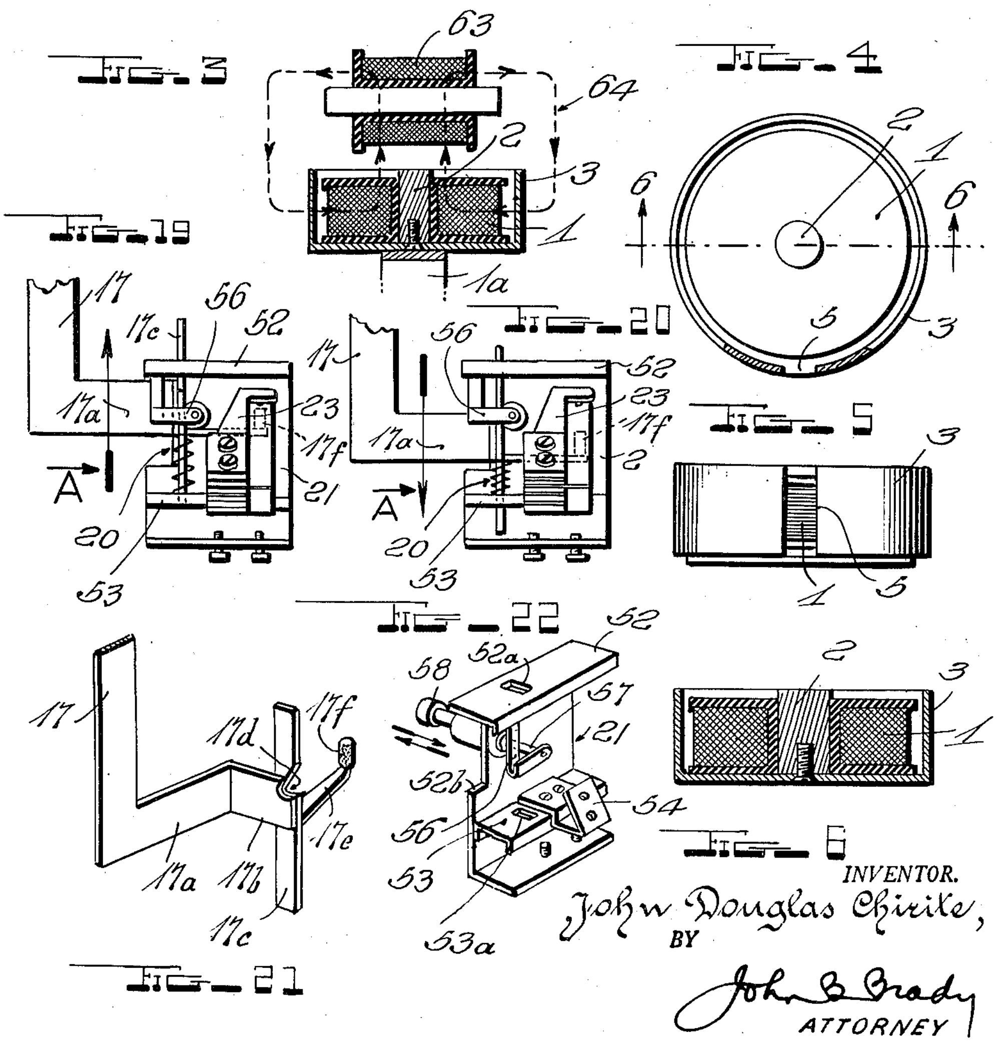
Figures 9, 10, 11:
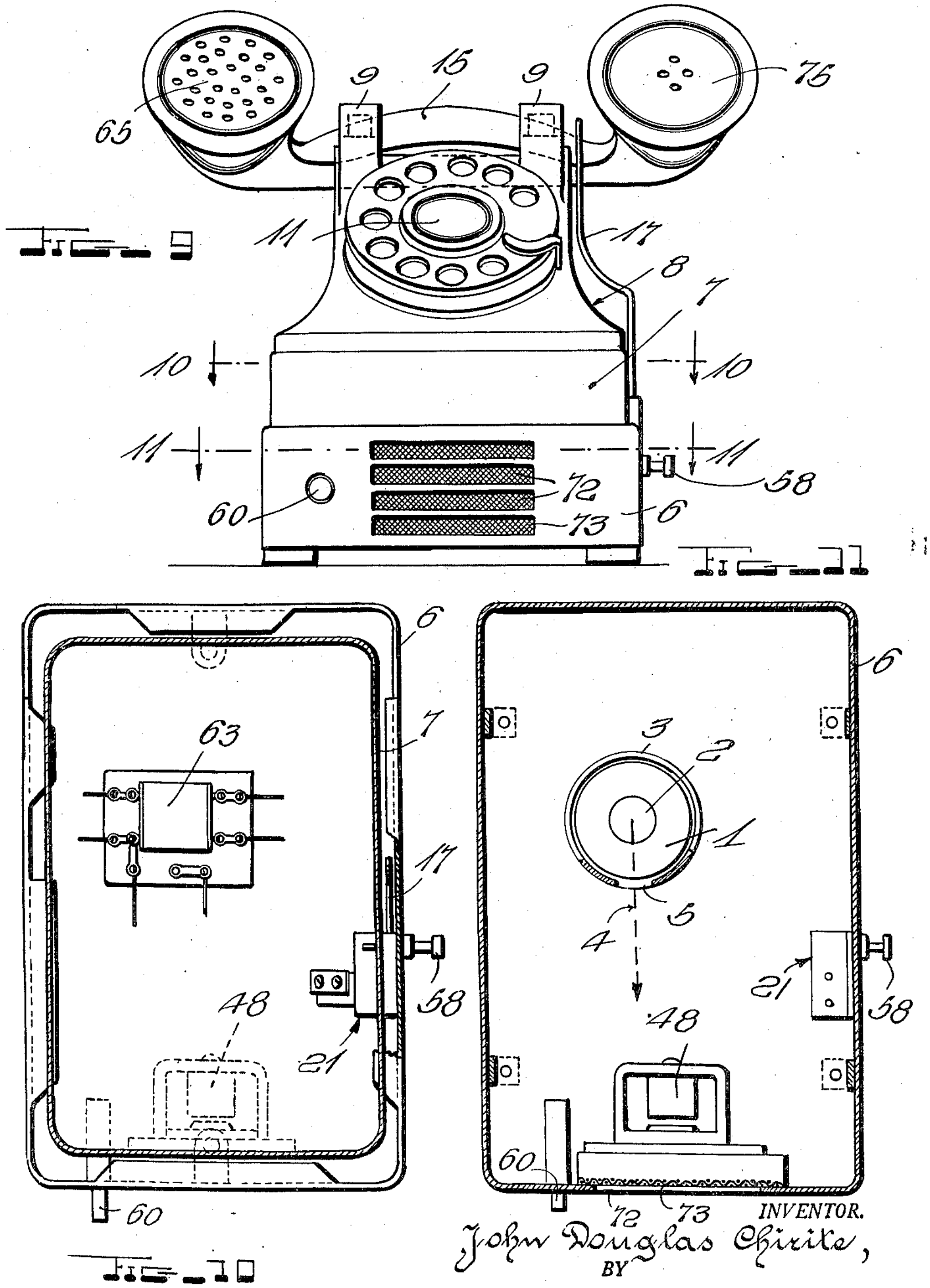
Figures 12, 13, 14, 23, 24:
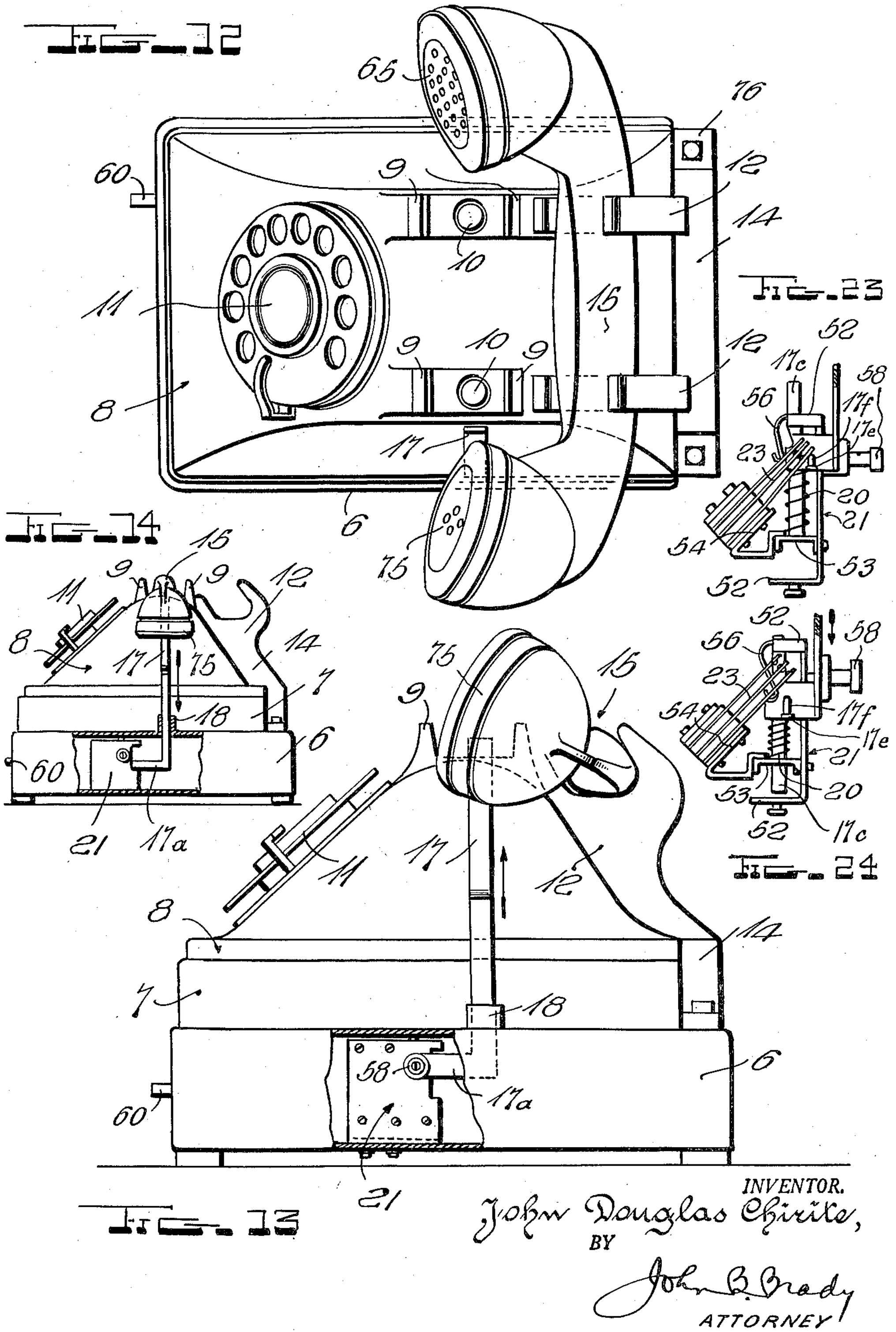

Other and further objects of my invention reside in the association of an auxiliary rack for the telephone handset of a conventional desk telephone in association with an amplifier and reproducer unit of compact arrangement for conference use of telephones as set forth more fully in the specification hereinafter following by reference to the accompanying drawings in which:

Figure 1 is a schematic circuit diagram of the telephone attachment unit of my invention; Fig. 2 is a schematic view illustrating the preferred manner of inductively coupling the attachment of my invention to the telephone line by merely resting the standard desk telephone upon the attachment as a base support without loading the telephone line or otherwise interfering with the telephone system facilities; Fig. 3 is a theoretical view explaining the manner of effecting the inductive coupling provided in the arrangement of Fig. 2; Fig. 4 is a plan view of the magnetically shielded magnetic pick-up coil employed in the attachment of my invention; Fig. 5 is a side elevational view of the magnetically shielded magnetic pick-up coil shown in Fig. 4; Fig. 6 is a transverse sectional view taken on line 6—6 of Fig. 4; Fig. 7 is a diagrammatic view illustrating the manner of establishing inductive connection between the amplifier unit of my invention and the wall box equipment of a telephone installation in lieu of the method of connection illustrated in Fig. 2; Fig. 8 is a perspective view showing the manner of attaching the pick-up coil to the wall box equipment illustrated in Fig. 7; Fig. 9 is a front view of the attachment of my invention illustrating the conventional telephone desk set located in position upon the attachment of my invention; Fig. 10 is a schematic plan view of the attachment of my invention illustrating the telephone set superimposed on the attachment, the view being taken substantially on line 10—10 of the base of the telephone set and showing the induction coil therein with which an inductive coupling is established with the amplification and reproducing means in the attachment; Fig. 11 is a horizontal sectional view of the attachment of my invention taken substantially on line 11—11 of Fig. 9 and showing the magnetically shielded magnetic pick-up coil therein located to align with and inductively couple with the induction coil in the base of the telephone set; Fig. 12 is a top plan view of the attachment in position beneath the conventional telephone desk set and showing the telephone handset removed to the cradle of the attachment for conference operation; Fig. 13 is a side elevation of the assembly of the attachment of my invention in the position illustrated in plan view in Fig. 12; Fig. 14 is a side elevational view of the attachment in position beneath the telephone set with the handset restored to normal position to cut off the attachment; Fig. 15 is a side elevational view of one form of circuit control device which may be employed in the attachment of my invention, the view illustrating the actuated position of the circuit control device for energization of the amplification system; Fig. 16 is an end view of the circuit control device of Fig. 15, showing the actuated position of the contacts thereof; Fig. 17 is a view of the circuit control device similar to Fig. 15 but showing the deactivated position of the circuit control device when the amplification system is cut off and the handset restored to normal position on the telephone stand; Fig. 18 is an end view of the circuit control device of Fig. 17 showing the position of the contacts when deactivated; Fig. 19 is an elevational view of the contact assembly of the circuit control device of Figs. 15–18 in unactuated position; Fig. 20 is a view similar to Fig. 19 but showing the contact assembly in actuated position; Fig. 21 is a perspective view of a fragmentary part of the actuating member extending between the telephone handset and the contact assembly; Fig. 22 is a fragmentary perspective view of the mounting member for the contact assembly and actuator of the circuit control device of Figs. 15–21; Fig. 23 is an end view of the circuit control device in circuit closing position looking in the direction of arrow A in Fig. 19; and Fig. 24 is an end view of the circuit control device in open circuit position looking in the direction of arrow A in Fig. 20.

The loud speaking telephone reproducer of my invention has been developed for convenient use for facilitating the conduct of business in offices, factories, and groups wherever efficiency can be increased by simultaneously advising numbers of persons with respect to both ends of a telephone conversation. The development of my invention provides for a waiting position of the telephone handset adjacent the normal position of the handset on the conventional telephone set, during which time the incoming telephone conversation is amplified by an attachment compactly associated with the telephone set so that the incoming telephone signals are audible over a relatively large area. There are many occasions in which efficiency is increased by having groups of individuals immediately informed of both ends of a telephone conversation and while the transmission end of the telephone conversation is readily heard by groups of individuals at the transmission end of the line, the telephone signal energy originating at the remote end of the line is generally audible to only the individual using the telephone. Heretofore efforts have been made to solve this problem by furnishing large groups of individuals with individual telephone receivers so that many persons may listen in to the telephone conversation. Such an arrangement is both inconvenient and relatively costly in equipment. Moreover such an arrangement requires a very special installation and substantial prearrangement and often the need equipment is not readily available when such conference use of a telephone system is required. Other methods of solving this problem have involved the installation of relatively large and costly amplifiers generally obtainable on a rental or lease basis which makes such an installation unduly expensive for the occasional use to which it may be placed. Other devices require that the handset be removed to a microphone and speaker amplifier unit which is cumbersome and inconvenient as compared to my arrangement where the conventional handset is simply reversed into a waiting position immediately adjacent the normal position of the handset on the telephone stand.

My invention involves the arrangement of elements of an electron tube amplifier and reproducer system within a compactly designed case which fits beneath the base of the conventional telephone desk set and occupies so small a space that it is generally undiscernible. The amplifier and reproducer attachment of my invention is so compact in size and light in weight that the conventional desk telephone stand is elevated only by approximately the thickness of an average book and so harmonizes and conforms with the standard desk telephone set that it has an aesthetic appearance and requires no more desk space than the conventional telephone desk set. The attachment includes a very special arrangement of amplification and reproducer elements which are electrically and magnetically shielded to prevent interception of unwanted stray magnetic fields which tend to produce a noise and/or oscillation in the amplifier output circuit. The input to the amplifier attachment is inductively coupled to the transformer or induction coil in the subscriber's desk telephone set to establish a magnetic coupling between the incoming telephone signaling energy and the amplifier and reproduction system.

In installations where desk telephone sets are employed which do not include a transformer or induction coil within the base of the desk telephone set, but which locate the transformer or induction coil in the wall box of the telephone system, I attach an external pick-up coil to the wall box and electrically connect the pick-up coil with the input circuit of the amplifier. The magnetic pick-up coil is of high impedance characteristic and works directly into the amplifier in the attachment of my invention or a low impedance pick-up device may be employed in association with a suitable matching transformer connected with the input circuit of the amplifier system. The amplifier employed in the attachment is equipped with miniature tubes powered from miniature batteries mounted in the unit or where desirable power from either an A. C. or D. C. lighting circuit may be employed for supplying power to the tubes of the amplifier. The loud speaker reproducer employed in the attachment of my invention, while in miniature size, is capable of reproduction of the remote telephone signal energy at sufficiently large volume to be audible over a relatively large area.

The casing of the amplifier is mounted below a frame structure which carries an auxiliary rack for a telephone handset. The frame structure is adapted to receive the conventional desk telephone set having the usual handset cradle. When the telephone is in conference use in accordance with my invention herein, the telephone handset may be removed from the cradle on the telephone desk set and is reversed and mounted on the auxiliary handset rack of the frame structure in such position that the amplification equipment and associated sound reproducer in the attachment functions as the signal receiving, amplifying and reproducing means for loud speaker conference use of the device. The transmitter of the telephone handset while in this substantially reverse position is directed upwardly and serves as a convenient microphone into which the voice may be directed in conducting a two-way telephone conversation where the incoming voice signals are amplified through the amplifier and loud speaker attachment of the unit of my invention simultaneously with the activation of the telephone receiver of the handset. This arrangement facilitates telephone conference calls in which a large group of individuals at each end of a telephone circuit may participate in the telephone conference where the telephone transmitter mounted in the substantially reverse or upwardly directed position in the auxiliary telephone handset cradle is utilized as a microphone pick-up at each end of the circuit for activation by speech from any individual who may desire to direct his voice into the properly positioned and maintained telephone transmitter while the response voice signals from the remote end of the line are reproduced through the loud speaker associated with the miniature amplifier beneath the telephone desk set.

I may provide switching means for automatically opening the cathode circuit of the amplifier unit beneath the base of the desk telephone set when the telephone handset is replaced on its cradle at the end of the conversation and automatically cutting on the cathode circuit when the handset is removed from the desk telephone set cradle to the auxiliary rack cradle. This feature conserves power and tube life since the user cannot accidentally and unintentionally leave the amplifier turned on when the attachment is no longer desired for use.

Referring to the drawings in more detail reference character 1 designates the telephone pick-up coil which is wound upon magnetic core structure 2 and electrically and magnetically shielded by magnetic shield 3 which substantially encloses pick-up coil 2 in all angular directions except the one radial direction indicated by arrow 4 which in the arrangement illustrated in Fig. 11 extends in a direction in which no appreciable electrical coupling may be established with the vital elements of the amplification system for eliminating tendency to produce noise and/or oscillation in the amplifier system and yet provide that discontinuity in the circuit path formed by casing 3 by gap 5 as will prevent the setting up of eddy currents with the losses incidental thereto.

The coupling coil 1 is mounted on an elevating bracket 1*a* in the base 6 housing the amplifier. The base 6 conforms in contour with the frame structure 7 of the conventional desk telephone set 8 which is mounted thereon and which serves as a mounting means for the conventional desk telephone set 8. The desk telephone set is illustrated as including cradle 9 containing switch control plunger 10 and the conventional dial structure 11, and supporting telephone handset 15 including receiver 65 and transmitter 75.

I provide an auxiliary handset cradle shown at 12 located immediately behind or adjacent to the conventional cradle 9 and supported by member 14 which abuts and conforms with the contour of the base of the telephone desk set 8, and is adapted to receive handset 15 in waiting position. Auxiliary handset cradle 12 is secured to base 6 by suitable means such as shown at 76.

It will be observed that a spring pressed plunger member 17 is mounted for vertical movement immediately adjacent frame structure 7 and base 6 through guide 18 in base 6 terminating in a position adjacent the telephone handset 15 when the telephone handset is resting in deenergized position in cradle 9 as shown in Fig. 14. The plunger 17 is spring controlled by means of spring 20 for operating the circuit control device 21 located within the base 6.

The circuit control device 21 comprises a substantially channel-shaped frame member 52 which is detachably mounted on the base 6 in alignment with the lower end of plunger 17. A channel-shaped strip 53 is secured longitudinally within channel-shaped frame 52 and serves as a shelf-like support for the bracket 54 on which the spring pile-up contact assembly shown at 23 is mounted. Spring 20 forces plunger 17 upward as soon as the telephone handset 15 is removed from a position obstructing the upward movement of plunger 17 as shown in Figs. 12, 13, 15, 16, 19 and 23. When the spring pile-up assembly 23 is operated the circuits of the tubes of the amplification system are energized and will normally remain energized until the telephone handset 15 is restored to position on cradle 9. However, I provide for the independent control of the circuits of the amplification system by means of a push button control member 58. With the amplification system automatically activated by removal of the telephone handset 15 from cradle 9, the plunger 17 may be depressed deactivating the amplification system and allowing normal use of the telephone handset. Upon being depressed the plunger 17 is automatically latched in depressed position as shown in Figs. 17, 18, 20 and 24. When it is desired to restore amplification system to operative condition push button 58 is depressed displacing detent 56 and permitting spring 20 to push plunger 17 upwardly. Spring detent 56 on frame member 52 is operative to engage in notch 17*d* in portion 17*b* of plunger 17 and hold the plunger down and the insulation member 17*f* disengaged from the spring pile-up assembly 23, as represented in Figs. 17–18, 20 and 24. The spring detent 56 is laterally disposed under the action of pin member 57 actuated by push button 58 operative through one side of base 6. By pushing in on push button 58 detent 56 is disengaged from notch 17*d* allowing spring 20 to push upwardly on portion 17*b* of plunger 17, and force member 17*f* into the position shown in Figs. 15, 17, 19 and 23 closing the contacts of the spring pile-up assembly 23 thus cutting on the amplification system. The amplification system then continues to operate until the handset 15 is again placed on the cradle 9 for again forcing down the plunger 17. The lower end of plunger 17 is turned inwardly at 17*a* and enters the base 6 where it is again turned at right angles at 17*b* and extends into frame member 52 through recess 52*b* therein. The portion 17*b* of the plunger carries strip member 17*c*, notched at 17*d*, and actuating arm 17*e* having insulation member 17*f* thereon. The strip member 17*c* passes slidably through apertures 52*a* and 53*a* in the channel-shaped frame member 22 and the channel-shaped strip 53 and serves to guide insulation member 17*f* into and out of operating position with respect to the spring pile-up assembly 23.

As shown in Fig. 1 the spring pile-up assembly 23 when open disconnects both A and B batteries, 24 and 51 from the amplifier system which is the condition which exists so long as the telephone handset 15 is allowed to rest in normal position in cradle 9. However, as soon as telephone handset 15 is removed from cradle 9 plunger 17 is moved upwardly under the action of spring 20 closing the contacts of spring pile-up assembly 23. Under these conditions the cathode heating current from batterry 24 is supplied to the cathodes 25*a*, 26*a* and 27*a* of tubes 25, 26 and 27, respectively, and the B battery circuit through battery 51 is closed.

The input circuit of the amplification system includes the high impedance pick-up coil 2 connected in series with the jack 29 which is normally shunted by co-acting contacts in the position illustrated in Fig. 1 and connected across the adjustable impedance circuit which contains resistance 30 shunted by condenser 31. The movable tap 32 on resistance 30 connects to control grid 25*b* of tube 25, the other end of the resistance 30 connecting to cathode 25*a*. The high impedance circuit extending from screen grid 25*c* includes resistor 35 and condenser 36. The high resistance path from screen grid 26*c* includes high resistor 37 and condenser 38. The screen grid 27*c* of tube 27 directly connects to the plate supply B battery 51 as shown.

Each tube includes a suppressor grid 25*d*, 26*d* and 27*d* connected to the cathode of the respective tubes at 25*a*, 26*a* and 27*a*. The output circuit of tube 25 extends from anode 25*e* through the high resistance path constituted by resistors 39 and 40, the latter being shunted by condenser 41. A coupling condenser 42 ccuples the high resistance output circuit of tube 25 with the high resistance input circuit of tube 26 which extends from control grid 26*b* through high resistance 43 to the cathode 26*a*. The output circuit of tube 26 extends from anode 26*e* through high resistance path 44. The output circuit of tube 26 is coupled to the input circuit tube 27 through coupling condenser 45. The input circuit of tube 27 includes control grid 27*b* connected through high resistance 46 with cathode 27*a*. The output circuit of tube 27 extends from anode 27*e* through the shielded transformer system 47 which connects to the permanent magnet loud speaker represented at 48. A bypass condenser 49 is arranged across the output circuit of tube 27. The permanent magnet speaker 48 has one side of the circuit thereof connected to ground through connection 50.

I provide a selector switch 60 in circuit with the actuating winding to the loud speaker 48 for connecting the output from transformer 47 either to the loud speaker 48 or to an output jack 61. The switch 60 and output jack 61 are suitably arranged as is jack 29, in the base 6, and are accessible from the front or rear thereof. I have indicated in Figs. 9, 10, 11, 12, 13 and 14 one possible location of switch 60. Switch 60 has two positions one of which 60*a* connects loud speaker 48 to the output transformer 47 and the other of which 60*b* connects the output transformer 47 through jack 61 to a power amplifier for securing very substantial volume in the reproduction of the incoming telephone voice currents.

As illustrated in Fig. 2 the base of the conventional telephone desk set 8 includes a line induction coil from transformer 63 through which incoming telephone signal currents pass as received from the remote end of the telephone line. It is this transformer or induction coil 63 with which magnetic coupling relation is established by the pick-up coil 1 of the amplifier circuit of my invention. I have represented by magnetic lines of force 64 the modulated field produced by the transformer or induction coil 63 and which threads the pick-up coil 1 of the amplification circuit in base 6 for operation of the loud speaker sound reproducer 48 simultaneously with the operation of the telephone receiver 65 of the telephone handset 15 in the position illustrated in the auxiliary cradle 12 in Figs. 12 and 13.

Figs. 11 and 10 when superimposed in the order named will make clear the manner of coupling the amplification system to the telephone receiver circuit while confining the magnetic lines of force to substantially the dimensional area of the induction coil 63 and pick-up coil 1. Thus the magnetic lines 64 are restricted in a zone which precludes interference with the circuits of the amplification system and minimizes the setting up of oscillations in the amplifier circuits.

As heretofore noted there are certain models of desk sets which locate the induction coil or transformer 63 in the wall box 66 of the telephone installation as represented at 67 in Fig. 7. In such installations as this I provide a pick-up coil 68 which is held by an elastic band 69 or other method to the outside of the telephone box 66 within the magnetic field of the induction coil or transformer 67. The modulated incoming signal currents are picked up by coil 68 and transmitted over the short flexible conductor 69 to the plug 70 which is inserted in the jack 29 resulting in the cutting out of pick-up coil 1 and the connection of pick-up coil 68 in the input circuit of the amplifier system, shown generally at 71 in Fig. 7 for operation of the loud speaker reproducer 48.

The exterior of the base 6 is suitably perforated as represented at 72 ornamented by a suitable grill 73 directly behind the perforations which are located in front of the loud speaker reproducer 48 so that the received telephonic currents from the remote end of the line are amplified and rendered audible throughout a relatively large area.

It is also practicable to use the base 6 in detached position from the standard telephone desk set 8 in which a frame structure is provided to accommodate an ash tray and cigarette or cigar holder or other decorative device and serves a functional as well as an ornamental purpose as a cover for base 6 on the desk. Under these circumstances the spring pressed plunger member 17 is not employed and the on and off condition of the amplifier unit is controlled manually.

The designs shown herein are typical of many constructions I employ in adapting the amplification system to office use in amplifying incoming telephone signal currents.

The attachment of my invention has been found to be extremely practical in construction and operation and while I have described my invention in certain preferred embodiments I realize that modifications may be made and I intend no limitations upon my invention other than may be imposed by the scope of the appended claims.

What I claim as new and desire to secure by Letters Patent of the United States is as follows:

1. A telephone device comprising a base support housing a miniature electronic amplifier having input and output circuits and a miniature loud speaker enclosed therein and conforming in contour and lateral dimensions with the shape and size of the base of a telephone desk set of the cradle and receiver-transmitter telephone handset type, the base of said telephone desk set being mounted upon said base support, the said base of said telephone desk including an induction coil traversed by telephone signal currents which pass through said receiver, an auxiliary cradle on said base support adjacent the cradle on the telephone desk set and operative to support the telephone handset in substantially reverse horizontal position when the telephone handset is removed from the cradle of said telephone desk set with the transmitter thereof directed upwardly as a pick-up microphone, and means in said base support establishing an electromagnetic coupling with the induction coil in the base of said desk set and connected with the input circuit of said miniature electronic amplifier for impressing upon said miniature electronic amplifier and loud speaker telephone signal currents which traverse said receiver.

2. A telephone device comprising a base support housing a miniature electronic amplifier having input and output circuits and a miniature loud speaker therein and conforming in contour and lateral dimensions with the shape and size of the base of a telephone desk set of the cradle and receiver-transmitter telephone handset type, the base of said telephone desk set being mounted upon said base support, the said base of said telephone desk set including an induction coil traversed by telephone signal currents which pass through the receiver of said telephone handset when said telephone handset is removed from said cradle, an electromagnetic device mounted in said base support in alignment with the induction coil in the base of said telephone desk set and magnetically coupled therewith and connected with the input circuit of said miniature electronic amplifier for amplifying and reproducing through said miniature loud speaker telephone signal currents which traverse said receiver, and means for confining the magnetic coupling between said induction coil and said electromagnetic device to substantially the dimensional area occupied by said induction coil and electromagnetic device.

3. A telephone device comprising a base support housing an electronic amplifier having input and output circuits and a miniature loud speaker therein and conforming in contour and lateral dimensions with the shape and size of the base of a telephone desk set of the cradle and receiver-transmitter telephone handset type, the base of said telephone desk set being mounted upon said base support, the said base of said telephone desk set including an induction coil traversed by telephone signal currents which pass through said receiver, an auxiliary cradle on said base support adjacent the cradle on the telephone desk set and operative to support the telephone handset in substantially reverse position when the telephone handset is removed from the cradle of said telephone desk set with the transmitter thereof directed upwardly as a pick-up microphone and an electromagnetic pick-up device disposed in said base support positionally and magnetically aligned and coupled with the induction coil in the base of said telephone desk set and electrically connected with the input circuit of said miniature electronic amplifier for picking up, amplifying and reproducing through said miniature loud speaker telephone signal currents which pass through the receiver of said telephone handset, and a shell-like shield substantially encircling said electromagnetic pick-up device for confining the magnetic coupling between said induction coil and said electromagnetic pick-up device to substantially the dimensional area thereof.

4. A telephone device comprising a base support housing a miniature electronic amplifier having input and output circuits and a miniature loud speaker therein and conforming in contour and lateral dimensions with the shape and size of the base of a telephone desk set of the cradle and receiver-transmitter telephone handset type, the base of said telephone desk set being mounted upon said base support, the said base of said telephone desk set including an induction coil traversed by telephone signal currents which pass through the receiver of said telephone handset when said telephone handset is removed from said cradle, an auxiliary cradle on said base support adjacent the cradle on the telephone desk set and operative to support the telephone handset in substantially reverse position when the telephone handset is removed from the cradle of said telephone desk set with the transmitter thereof directed upwardly at an angle for receiving voice energy directed thereto, an electromagnetic pick-up device disposed in said base support and magnetically aligned and coupled with the induction coil in the base of the telephone desk set and electrically connected with the input circuit of said miniature electronic amplifier, for picking up, amplifying and reproducing through said miniature loud speaker telephone signal currents which pass through the receiver of said telephone handset when said telephone handset is in activated condition, and means for electrically shielding said electromagnetic pick-up device in said base support from said amplifying and reproducing means and confining the lines of force between said induction coil and said electromagnetic pick-up device to a vertically disposed isolated zone in said miniature amplifier and preventing the establishment of interfering oscillations in the input and output circuits thereof.

5. A telephone device comprising a base support housing a miniature electronic amplifier having input and output circuits and a miniature loud speaker therein and conforming in contour and lateral dimensions with the shape and size of the base of a telephone desk set of the cradle and receiver-transmitter telephone handset type, the base of said telephone desk set being mounted upon said base support, the said base of said telephone desk set including an induction coil traversed by telephone signal currents which pass through the receiver of said telephone handset when said telephone handset is removed from said cradle, an auxiliary cradle on said base support adjacent the cradle on the telephone desk set and operative to support the telephone handset in substantially reverse position when the telephone handset is removed from the cradle of said telephone desk set, an electromagnetic pick-up device disposed in said base support and magnetically aligned and coupled with the induction coil in the base of the telephone desk set and electrically connected with the input current of said electronic amplifier for picking up, amplifying and reproducing through said miniature loud speaker telephone signal currents which pass through the receiver of said telephone handset when said telephone handset is in activated condition and an open circuited electrical shield associated with said electromagnetic pick-up device and selectively positioned for electrically shielding said electromagnetic pick-up device from the input and output circuits of said miniature amplifier and said miniature loud speaker while minimizing eddy current losses and maintaining magnetic coupling relationship between the induction coil in said telephone desk set and said electromagnetic pick-up device.

6. An attachment for telephones comprising a base support substantially conforming in contour and lateral dimensions with the shape and size of the base of a telephone desk set of the cradle and receiver-transmitter telephone handset type, a miniature electronic amplifier having input and output circuits and a miniature sound reproducer enclosed by said base support, means for electromagnetically coupling the input circuit of said miniature electronic amplifier with the circuit leading to the receiver of said telephone handset, said base support having an auxiliary cradle thereon operative to receive and support the telephone handset when said telephone handset is removed from the cradle on the telephone desk set and activated by telephone currents therethrough, a circuit controller mounted in said base support and including contactors associated with the circuits of said electronic amplifier and an actuator extending into abutting relation with said telephone handset when mounted upon the cradle of the telephone desk set whereby the position of the telephone handset on the cradle of the telephone desk set controls the activation or deactivation of the circuits of said miniature electronic amplifier.

7. An attachment for telephones comprising a base support substantially conforming in contour and lateral dimensions with the shape and size of the base of a telephone desk set of the cradle and receiver-transmitter telephone handset type, a miniature electronic amplifier having input, output and power circuits and a miniature sound reproducer enclosed by said base support, means for electromagnetically coupling the input circuit of said miniature electronic amplifier with the circuit leading to the receiver of said telephone handset, said base support having an auxiliary cradle thereon operative to receive and support the telephone handset when said telephone handset is removed from the cradle on the telephone desk set and actuated by telephone currents therethrough, a spring actuated circuit controller having contactors associated with the power circuits of said electronic amplifier and movable to either of two positions for turning on or off the power circuits of the miniature electronic amplifier, a vertically movable member connected with said circuit controller and extending into the path of the cradle of the telephone desk set whereby said vertically movable member may be displaced upon removal of the telephone handset to the auxiliary cradle on said base support for operating said circuit controller and activating the power circuit said miniature electronic amplifier and said member restored to normal position upon restoration of the telephone handset to the cradle of said desk set for conditioning said circuit controller to deactivate the power circuits of said miniature electronic amplifier.

JOHN DOUGLAS CHIRITE.

REFERENCES CITED

The following references are of record in the file of this patent:

UNITED STATES PATENTS

| Number | Name | Date |
|---|---|---|
| 2,005,973 | Hellmann | June 25, 1935 |
| 2,160,829 | Cherry | June 6, 1939 |
| 2,214,992 | Chwassus | Sept. 17, 1940 |
| 2,320,838 | Watson | June 1, 1943 |
| 2,354,470 | Topken | July 25, 1944 |
| 2,381,097 | Adams | Aug. 7, 1945 |
| 2,384,604 | Dann | Sept. 11, 1945 |
| 2,402,341 | Patterson | June 18, 1946 |

FOREIGN PATENTS

| Number | Country | Date |
|---|---|---|
| 285,084 | Italy | Apr. 30, 1931 |